United States Patent
Watanabe

(10) Patent No.: US 7,317,214 B2
(45) Date of Patent: ***Jan. 8, 2008

(54) AMPLIFYING SOLID-STATE IMAGE PICKUP DEVICE

(75) Inventor: Takashi Watanabe, Kyoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 324 days.

This patent is subject to a terminal disclaimer.

(21) Appl. No.: 11/001,179

(22) Filed: Dec. 2, 2004

(65) Prior Publication Data

US 2005/0116264 A1    Jun. 2, 2005

(30) Foreign Application Priority Data

Dec. 2, 2003    (JP)    ............................ P2003-403089

(51) Int. Cl.
*H01L 29/732*    (2006.01)

(52) U.S. Cl. ..................... 257/183.1; 257/238; 257/292

(58) Field of Classification Search ..................... None
See application file for complete search history.

(56) References Cited

U.S. PATENT DOCUMENTS

| | | | |
|---|---|---|---|
| 5,322,944 A | | 6/1994 | Guillaumet |
| 5,856,686 A | | 1/1999 | Watanabe et al. |
| 6,037,577 A | * | 3/2000 | Tanaka et al. ............ 250/208.1 |
| 6,316,760 B1 | | 11/2001 | Koyama |
| 6,674,471 B1 | | 1/2004 | Masuyama |
| 6,992,341 B2 | * | 1/2006 | Watanabe ................... 257/292 |
| 2004/0135064 A1 | | 7/2004 | Mabuchi |
| 2005/0161712 A1 | * | 7/2005 | Koyama et al. ............ 257/292 |
| 2005/0212937 A1 | * | 9/2005 | Koyama ..................... 348/301 |

FOREIGN PATENT DOCUMENTS

| | | |
|---|---|---|
| JP | 5-207375 | 8/1993 |
| JP | 9-46596 A | 2/1997 |

(Continued)

OTHER PUBLICATIONS

Chinese Office Action dated Aug. 18, 2006 w/English translation.

(Continued)

*Primary Examiner*—Alonzo Chambliss
(74) *Attorney, Agent, or Firm*—Harness, Dickey & Pierce

(57) ABSTRACT

An amplifying solid-state image pickup device includes photoelectric conversion transfer parts respectively composed of a photodiode and a transfer transistor, and a switched capacitor amplification part provided for every k (k: natural number) photoelectric conversion transfer parts. The switched capacitor amplification part includes an inverting amplifier composed of transistors, a reset transistor and a capacitor respectively inserted between input and output of the inverting amplifier, and a select transistor inserted between output side of the inverting amplifier and a vertical signal line. Input side of the inverting amplifier of the switched capacitor amplification part serves as a signal charge storage part common to k photoelectric conversion transfer parts. Output side of the inverting amplifier of the switched capacitor amplification part is connected to the vertical signal line via the select transistor.

6 Claims, 11 Drawing Sheets

FOREIGN PATENT DOCUMENTS

| | | |
|---|---|---|
| JP | 11-355664 | 12/1999 |
| JP | 2000-152086 | 5/2000 |
| JP | 2003-219277 | 7/2003 |
| JP | 2004104676 A * | 4/2004 |
| KR | 1997-68498 A | 10/1997 |
| KR | 2000-11777 A | 2/2000 |

OTHER PUBLICATIONS

Korean Office Action issued May 10, 2006 in the counterpart Korean Application.

Ikuko Inoue et al., "New LV-BPD (Low Voltage Buried Photo-Diode) for CMOS Imager", IEDM Tech. Digest, 1999, pp. 883-886.

* cited by examiner (a)

(b)

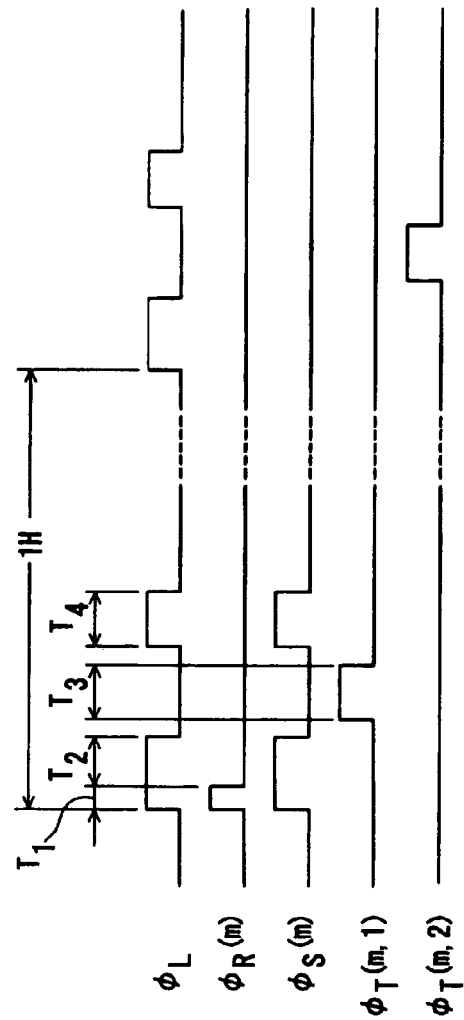

AMPLIFYING SOLID-STATE IMAGE PICKUP DEVICE

CROSS-REFERENCE TO RELATED APPLICATION

This nonprovisional application claims priority under 35 U.S.C. §119(a) on Patent Application No. 2003-403089 filed in Japan on Dec. 2, 2003, the entire contents of which are hereby incorporated by reference.

BACKGROUND OF THE INVENTION

The present invention relates to an amplifying solid-state image pickup device and a driving method therefor.

Conventionally, there has been proposed an amplifying solid-state image pickup device which has a pixel section having an amplification function and a scanning circuit disposed around the pixel section, where pixel data is read from the pixel section by the scanning circuit. In particular, there has been known an APS (Active Pixel Sensor) type image sensor formed of CMOSs (Complementary Metal Oxide Semiconductor) which are advantageous for integration of the pixel part with peripheral drive circuit and signal processing circuit.

For the APS type image sensor, there is a need for forming a photoelectric conversion part, an amplification part, and a pixel select part and a reset part normally within one pixel. Therefore, in the APS type image sensor, normally, three to four MOS transistors (Tr) are used in addition to the photoelectric conversion part formed of photodiodes (PD).

FIG. 8 shows a construction of an APS type image sensor which employs one photodiode (PD) and four MOS transistors (Tr) to make up a PD+4Tr system. This PD+4Tr system APS image sensor is disclosed in, for example, Reference "I. Inoue et al., IEDM Tech. Digest, pp. 883-886 (1999)."

The APS type image sensor of the PD+4Tr system shown in FIG. 8 is made up of a photodiode 201 as a "PD" and, as the "4Tr," a transfer transistor 202 for transferring signal charge stored in the photodiode 201, a reset transistor 231, an amplification transistor 232 and a pixel select transistor 233. In this case, assuming that the photodiode 201 is given as buried type and signal charge transfer from the photodiode 201 is perfect, it is known that quite great noise reduction can be achieved and that high-quality images can be obtained.

A drive pulse for the transfer transistor 202 is represented by $\phi_T$, a drive pulse for the reset transistor 231 is represented by $\phi R_R$, and a drive pulse for the pixel select transistor 233 is represented by $\phi_S$. Also, a vertical signal line 235 is grounded via a constant-current load transistor 234 to which a drive pulse $\phi_L$ is applied, where an output signal $V_S$ is obtained. In addition, $V_{DD}$ represents a power supply voltage (constant voltage).

FIGS. 9A, 9B, 9C, . . . , 9G are timing charts for explaining circuit operation of the PD+4Tr system APS image sensor shown in FIG. 8.

Drive pulses $\phi_R(m)$, $\phi_S(m)$ and $\phi_T(m)$ for the m-th row (where m is a natural number) and $\phi_R(m+1)$, $\phi_S(m+1)$ and $\phi_T(m+1)$ for the (m+1)th line are repetitions of a similar drive pulse voltage waveform on a basis of one horizontal scan period (1H). Therefore, a description is given below about one horizontal scan period of the m-th row.

First, in a period $T_1$, a drive pulse $\phi_R(m)$ to be applied to the gate of the reset transistor 231 goes High level, where potential level of the gate rises, resulting in an On state of the reset transistor 231. Resultantly, there occurs a charge move from a signal charge storage part 208 to the drain of the reset transistor 231, causing the voltage of the signal charge storage part 208 to be reset to the power supply voltage $V_{DD}$. In this state, the drive pulse $\phi_L$ applied to the gate of the constant-current load transistor 234 goes High level, resulting in an On state of the constant-current load transistor 234, while the drive pulse $\phi_S(m)$ applied to the gate of the pixel select transistor 233 goes High level, resulting in an On state of the pixel select transistor 233.

In the next period $T_2$, the drive pulse $\phi_R(m)$ applied to the gate of the reset transistor 231 goes Low level, resulting in an Off state of the reset transistor 231. However, because the drive pulse $\phi_S(m)$ applied to the gate of the pixel select transistor 233 is at High level and the pixel select transistor 233 is in the On state, a reset level of the signal charge storage part 208 is read to the vertical signal line 235 via the amplification transistor 232 and the pixel select transistor 233.

In the next period $T_3$, the drive pulse $\phi_S(m)$ applied to the gate of the pixel select transistor 233 goes Low level, resulting in an Off state of the pixel select transistor 233, and the drive pulse $\phi_T(m)$ applied to the gate of the transfer transistor 202 goes High level, where the potential level of the gate rises, resulting in an On state of the transfer transistor 202. Resultantly, the signal charge stored in the photodiode 201 is transferred to the signal charge storage part 208.

In the next period $T_4$, the drive pulse $\phi_T(m)$ applied to the gate of the transfer transistor 202 goes Low level, resulting in an Off state of the transfer transistor 202, while the signal charge storage part 208 is held at the voltage of the transferred signal charge. Then, because the drive pulse $\phi_S(m)$ applied to the gate of the pixel select transistor 233 is at High level and the pixel select transistor 233 is in the On state, a signal level is read to the vertical signal line 235 via the amplification transistor 232 and the pixel select transistor 233. When this occurs, the drive pulse $\phi_L$ applied to the gate of the constant-current load transistor 234 goes High level, resulting in an On state of the constant-current load transistor 234.

For the circuit construction of FIG. 8 and the circuit operation of FIGS. 9A, 9B, 9C, . . . , 9G described above, four transistors and one photodiode are required for each one pixel, which makes a constraint on downsizing of the pixel size. For this reason, there have been made approaches to reduction of the transistor count per pixel.

FIG. 10 shows an amplifying solid-state image pickup device in which a signal charge storage part 208, a reset transistor 231, an amplification transistor 232 and a pixel select transistor 233 are provided in common to a plurality of photodiodes 201 and transfer transistors 202 (see, e.g., JP 09-46596 A).

Operation of the amplifying solid-state image sensor of FIG. 10 is shown in timing charts of FIGS. 11A, 11B, 11C, 11D and 11E.

As shown in FIGS. 11A, 11B, 11C, 11D and 11E, in a period $T_1$, a drive pulse $\phi_R(m)$ applied to the gate of the common reset transistor 231 turns to an On state, where the potential level of the gate rises. Resultantly, there occurs a charge move from the common signal charge storage part 208 to the drain of the common reset transistor 231, causing the voltage of the signal charge storage part 208 to be reset to the power supply voltage $V_{DD}$. In this state, the drive pulse $\phi_L$ applied to the gate of the constant-current load transistor 234 goes High level, resulting in an On state of the constant-current load transistor 234, while the drive pulse φ$_S$(m) applied to the gate of the pixel select transistor 233 goes High level, resulting in an On state of the pixel select transistor 233.

In the next period T$_2$, the drive pulse φ$_R$(m) applied to the gate of the common reset transistor 231 goes Low level, resulting in an Off state of the common reset transistor 231. However, because the drive pulse φ$_S$(m) applied to the gate of the common pixel select transistor 233 is at High level and the common pixel select transistor 233 is in the On state, the reset level is read to the vertical signal line 235 via the common amplification transistor 232 and pixel select transistor 233.

In the next period T$_3$, the drive pulse φ$_S$(m) applied to the gate of the common pixel select transistor 233 goes Low level, resulting in an Off state of the common pixel select transistor 233, and the drive pulse φ$_T$(m) applied to the gate of the transfer transistor 202 of the m-th row goes High level, where the potential level of the gate rises, resulting in an On state of the transfer transistor 202. Resultantly, the signal charge stored in the photodiode 201 of the m-th row is transferred to the signal charge storage part 208.

In the next period T$_4$, the drive pulse φ$_T$(m) applied to the gate of the transfer transistor 202 of the m-th row goes Low level, resulting in an Off state of the transfer transistor 202, while the common signal charge storage part 208 is held at the voltage of the transferred signal charge. Then, because the drive pulse φ$_S$(m) applied to the gate of the common pixel select transistor 233 is at High level and the common pixel select transistor 233 is in the On state, the signal level of the m-th row is read to the vertical signal line 235 via the common amplification transistor 232 and pixel select transistor 233. When this occurs, the drive pulse φ$_L$ applied to the gate of the constant-current load transistor 234 goes High level, resulting in an On state of the constant-current load transistor 234.

Then, after one horizontal scan period (1H), for pixels of the (m+1)th line, the signal charge is derived from the photodiode 201 of the (m+1)th line via the transfer transistor 202 of the (m+1)th line, where the same operations as in the periods T$_1$ to T$_4$ are performed by the common reset transistor 231, amplification transistor 232 and pixel select transistor 233.

In the construction and operation of the amplifying solid-state image pickup devices shown in FIGS. 10, 11A, 11B, 11C, 11D and 11E, an assumption that one common part is given for two pixels is equivalent to 2.5 transistors per pixel, and an assumption that one common part is given for 4 pixels is equivalent to 1.75 transistors per pixel. That is, in these examples, it becomes achievable to reduce the transistor count per pixel by 1.5 to 2.25.

However, in the construction and operation of the amplifying solid-state image pickup devices shown in FIGS. 10, 11A, 11B, 11C, 11D and 11E, there arise problems as shown below. That is, given that the capacity of the common signal charge storage part 208 is C$_{FD}$, a charge-voltage conversion efficiency η at which signal charge Qsig derived from the photodiode 201 is converted to a voltage signal Vsig is $$\eta = G \cdot Vsig/Qsig = G/C_{FD} \quad \text{(Eq. 1)}$$

where G is the gain of a source follower circuit made up of the amplification transistor 232 and the constant-current load transistor 234, being smaller than 1.

As apparent from Equation 1, the capacity C$_{FD}$ needs to be reduced in order to enlarge the charge-voltage conversion efficiency η. The capacity C$_{FD}$ of the common signal charge storage part 208 is a sum of a drain-side junction capacitance of the transfer transistor 202 and a gate capacitance of the amplification transistor 232, both transistors being connected to the signal charge storage part 208. Therefore, the drain junction capacitance of the transfer transistors increases according as the number of photodiodes and transfer transistors connected to a common signal charge storage part increases, which leads to a problem that the charge-voltage conversion efficiency η decreases.

SUMMARY OF THE INVENTION

The present invention, intended to solve these problems, has an object of providing an amplifying solid-state image pickup device, which is capable of obtaining noise-reduced high-quality images and reducing the transistor count per pixel to a large extent to miniaturize the pixel size as well as a driving method therefor.

In order to achieve the above object, according to the present invention, there is provided an amplifying solid-state image pickup device comprising:

a plurality of photoelectric conversion transfer parts which are provided for individual pixels, respectively, and each of which has a photoelectric conversion element and a transfer transistor for transferring signal charge of the photoelectric conversion element, wherein the plurality of photoelectric conversion transfer parts are divided into a plurality of photoelectric conversion transfer part groups each composed of a specified number of the photoelectric conversion transfer parts, respectively; and wherein the photoelectric conversion transfer part groups are arrayed in a matrix shape, and further comprising:

a plurality of switched capacitor amplification parts which are provided for the individual photoelectric conversion transfer part groups, respectively, whose input side is connected to an output side of each transfer transistor of the photoelectric conversion transfer parts and whose output side is connected to a signal line; and a control part for, in each of the photoelectric conversion transfer part groups, controlling the transfer transistor and the switched capacitor amplification parts so as to iterate an operation of reading a signal from the photoelectric conversion element via the transfer transistor for the individual photoelectric conversion transfer parts, respectively, by the switched capacitor amplification part.

In this amplifying solid-state image pickup device having the above constitution, the control part controls the transfer transistors and the switched capacitor amplification part, in each of the photoelectric conversion transfer part groups, so as to iterate the operation of reading a signal from the photoelectric conversion element via the transfer transistor for the individual photoelectric conversion transfer parts, respectively, by the switched capacitor amplification part. By including a common amplification circuit (switched capacitor amplification part) for a plurality of pixels of each of the photoelectric conversion transfer part groups, it becomes possible to reduce a transistor count per pixel. Also, by including an amplification circuit of the switched capacitor type, it becomes possible to effectively reduce the capacity of the signal charge storage part, so that the charge-voltage conversion gain can be enhanced. Accordingly, an image of less noise and high quality can be obtained, and moreover the transistor count per pixel can be reduced to a large extent, allowing a downsizing of the pixel size.

In one embodiment, the switched capacitor amplification part comprises:

a signal charge storage part to which the output sides of respective transfer transistors of the photoelectric conversion transfer part group are connected;

an inverting amplifier to an input side of which the signal charge storage part is connected;

a reset transistor which is connected between input and output of the inverting amplifier;

a capacitance element which is connected between input and output of the inverting amplifier; and a select transistor which is connected between an output side of the inverting amplifier and the signal line.

In this embodiment, the switched capacitor amplification part for converting into voltage and amplifying the signal charge transferred from the photoelectric conversion element of the photoelectric conversion transfer part groups via the transfer transistor can be realized with a simple construction.

In one embodiment, the photoelectric conversion element is a buried photodiode.

In one embodiment, for transfer of signal charge from the photoelectric conversion element to the signal charge storage part of the switched capacitor amplification part via the transfer transistor, the control part controls voltage of a grounding-side terminal of the inverting amplifier so that potential of the input side of the inverting amplifier of the switched capacitor amplification part becomes deeper.

In this embodiment, when the charge is transferred from the photoelectric conversion element to the signal charge storage part via the transfer transistor, the control part controls the voltage of the grounding-side terminal of the inverting amplifier so that the potential of the input side (signal charge storage part) of the inverting amplifier is deepened, thus making it easier to transfer the signal charge. As a result, particularly with the photoelectric conversion element being a buried photodiode, the charge transfer from the photodiode to the signal charge storage part can be made perfect, thus making it implementable to reduce the read noise to a large extent.

In one embodiment, a power-supply side transistor out of transistors constituting the inverting amplifier of the switched capacitor amplification part is of a depression type.

In this embodiment, the power-supply side transistor out of the transistors constituting the inverting amplifier is given as a depression-type transistor that is smaller in threshold voltage, the gain of the inverting amplifier can be made larger. Moreover, there can be a larger effect for deepening the input-side potential of the inverting amplifier when the grounding-side terminal of the inverting amplifier is set to high level.

Furthermore, in one embodiment, a potential of a channel region of the transfer transistor in an Off state and a potential of a channel region of the reset transistor in an Off state are deeper than a substrate voltage, and the potential of the channel region of the reset transistor in the Off state is deeper than the potential of the channel region of the transfer transistor in the Off state.

In this embodiment, signal charge excessively generated upon incidence of excessive light on a particular photodiode can be discharged to the output and of the inverting amplifier via the transfer transistor and the reset transistor. Accordingly, it becomes possible to suppress the occurrence of blooming due to an overflow of excessively generated signal charge to neighboring photodiodes.

Also, according to the present invention, there is provided a driving method for the above amplifying solid-state image pickup device comprising:

a first step of turning on a reset transistor of the switched capacitor amplification part to perform a reset operation;

a second step of, after the first step, turning off the reset transistor to perform a read operation of a reset level outputted from an inverting amplifier of the switched capacitor amplification part with a select transistor of the switched capacitor amplification part in an On state;

a third step of, after the second step, turning on the transfer transistor of the photoelectric conversion transfer part to perform charge transfer from the photoelectric conversion transfer part to the switched capacitor amplification part; and a fourth step of, after the third step, turning on the select transistor to perform a read operation of a signal level outputted from the inverting amplifier of the switched capacitor amplification part, wherein in each of the photoelectric conversion transfer part groups, operations of the first step to the fourth step are iterated for individual photoelectric conversion transfer parts, respectively, connected to the signal charge storage part of the switched capacitor amplification part, whereby a signal is read from each photoelectric conversion element of the photoelectric conversion transfer part groups.

In this driving method for the amplifying solid-state image pickup device, the transfer of signal charge on the pixel basis of the amplifying solid-state image pickup device can be implemented with secure discrimination. Further, interconnections for the photoelectric conversion transfer parts of the pixels and a circuit for generating the timing can be made up simply.

In one embodiment, in the third step, voltage of a grounding-side terminal of the inverting amplifier is controlled so that an input-side potential of the inverting amplifier of the switched capacitor amplification parts becomes deeper.

In this embodiment, by setting the grounding-side terminal of the inverting amplifier to High level, it becomes possible to deepen the voltage of the signal charge storage part, making it implementable to achieve a perfect charge transfer.

As apparent from the above description, according to the amplifying solid-state image pickup device as well as driving method therefor of the present invention, using a switched-capacitor type amplifier common to a plurality of pixels makes it possible to reduce a transistor count per pixel to a large extent. For example, when a switched-capacitor type amplifier is common to 8 pixels, the transistor count per pixel reduces from 4 to 1.5. This produces a great advantage for reduction of the pixel size. Furthermore, using a buried-type photodiode making it possible to perform an operation of enhancing the signal charge transfer from the photodiode, thus making it possible to obtain an image of quite low noise by virtue of a perfect charge transfer.

Thus, the amplifying solid-state image pickup device of the present invention is greatly useful for the formation of small-size, high-performance image sensors.

BRIEF DESCRIPTION OF THE DRAWINGS

The present invention will become more fully understood from the detailed description given hereinbelow and the accompanying drawings which are given by way of illustration only, and thus are not intended to limit the present invention, and wherein:

FIGS. 11A, 11B, 11C, 11D and 11E are timing charts of drive pulses in the amplifying solid-state image pickup device.

DETAILED DESCRIPTION OF THE PREFERRED EMBODIMENTS

Hereinbelow, an amplifying solid-state image pickup device and a driving method therefor of the present invention are described by reference to embodiments shown in the accompanying drawings.

Figure 1:
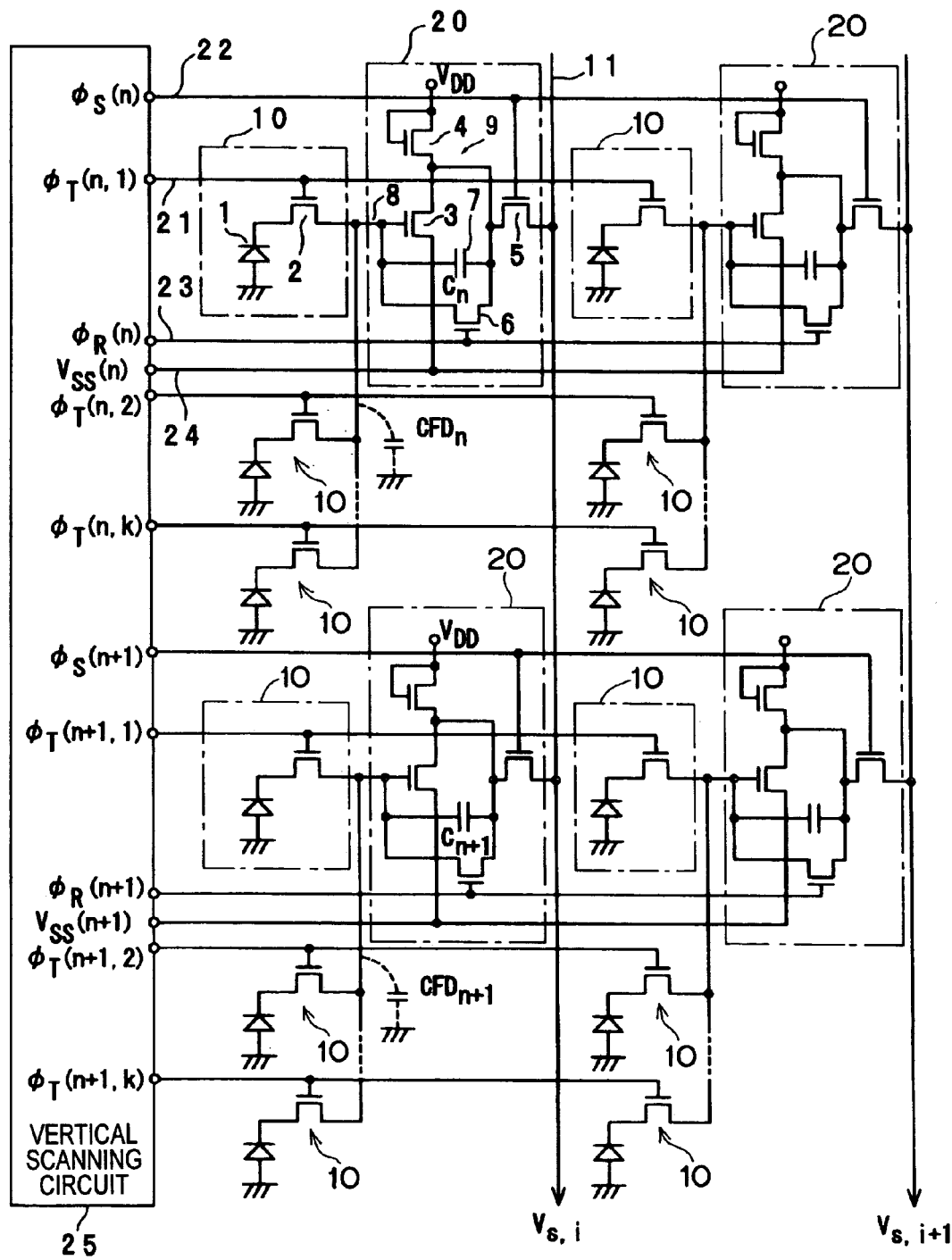
FIG. 1 is a circuit diagram showing circuit construction of main part of a two-dimensional amplifying solid-state image pickup device according to an embodiment of the invention.

FIG. 1 is a circuit diagram showing circuit construction of main part of a two-dimensional amplifying solid-state image pickup device as an example of an amplifying solid-state image pickup device according to an embodiment of the invention, where a plurality of pixels are two-dimensionally arrayed in the two-dimensional amplifying solid-state image pickup device. In FIG. 1, reference numeral 10 denotes a photoelectric conversion transfer part existing in every pixel, 20 denotes a switched capacitor amplifier part for converting signal charge derived from the photoelectric conversion transfer part 10 into voltage to amplify the voltage, and 25 denotes a vertical scanning circuit as an example of a control part. In FIG. 1 are shown only two columns, i.e. i-th column and (i+1)th column, out of the photoelectric conversion transfer parts 10 of plural rows and plural columns, where the switched capacitor amplifier part 20 is connected to every k photoelectric conversion transfer parts 10 as a photoelectric conversion transfer part group in each column. It is noted that k and i are each an integer of not less than 2.

The photoelectric conversion transfer part 10 is made up of a photodiode 1 as an example of a photoelectric conversion element whose anode is connected to the ground, and a transfer transistor 2 whose drain is connected to a cathode of the photodiode 1. Also, the switched capacitor amplifier part 20 is made up of an inverting amplifier 9 composed of a transistor 3 and a transistor 4, a reset transistor 6 and a capacitor 7 as an example of a capacitance element, both being inserted between input and output of the inverting amplifier 9, and a select transistor 5 inserted between the output side of the inverting amplifier 9 and a vertical signal line 11. On the input side of the inverting amplifier 9 is a signal charge storage part 8 to which k photoelectric conversion transfer parts are commonly connected at their output side (source of the transfer transistors 2). It is noted that a capacity of the signal charge storage part 8 is expressed by $C_{FD}$, and a capacity of the capacitor 7 is by $C_{in}$. In addition, in FIG. 1, the signal charge storage part 8 extends from an input end of the switched capacitor amplifier part 20 to an output side of each transfer transistors 2.

Referring also to FIG. 1, reference numeral 21 denotes a transfer transistor drive signal line, 22 denotes a select transistor drive signal line, 23 denotes a reset transistor drive signal line, and 24 denotes a switched-capacitor-amplifier grounding side signal line. The transfer transistor drive signal line 21 is connected to the gate of the transfer transistor 2 of each of the photoelectric conversion transfer parts 10 arrayed along the row direction. The select transistor drive signal line 22 is connected to the gate of the select transistor 5 of the switched capacitor amplifier part 20. The reset transistor drive signal line 23 is connected to the gate of the reset transistor 6 of the switched capacitor amplifier part 20. Further, the switched-capacitor-amplifier grounding side signal line 24 is connected to the grounding-side terminal of the inverting amplifier 9 of the switched capacitor amplifier part 20.

Referring to FIG. 1, on the upper side are the n-th (where n is an integer) photoelectric conversion transfer part group and switched capacitor amplifier part 20, while on the lower half are the (n+1)th photoelectric conversion transfer part group and switched capacitor amplifier part 20. A pixel of the first row connected to the n-th switched capacitor amplifier part 20 is expressed by (n, 1), and a pixel of the second row is by (n, 2), . . . , a pixel of the k-th row is by (n, k). Therefore, in the case where the two-dimensional amplifying solid-state image pickup device is constructed of p switched capacitor amplifier parts 20 along the vertical direction, where p is an integer of not less than 2, the device has k×p pixels in all along the vertical direction. Drive pulses $\phi_T(n, 1)$, $\phi_T(n, 2)$, . . . , $\phi_T(n, k)$ outputted from a vertical scanning circuit 25 are applied to the gate of the transfer transistor 2 of each of the pixel (n, 1), pixel (n, 2), . . . , pixel (n, k) via each of transfer transistor drive signal lines 21.

A drive pulse $\phi_R(n)$ is applied to the gate of the reset transistor 6 of the n-th switched capacitor amplifier part 20 via the reset transistor drive signal line 23, and a drive pulse $\phi_S(n)$ for the select transistor 5 is applied via the select transistor drive signal line 22.

Further, a constant-voltage of a power supply $V_{DD}$ is applied to gate and drain of the High-side transistor 4 of the inverting amplifier 9, while a drive pulse $\phi_{SS}(n)$ is applied to the source of the Low-side transistor 3 of the inverting amplifier 9 via the switched-capacitor-amplifier grounding side signal line 24.

Then, an output signal $V_{s,i}$ is obtained from an output signal line 11 of the i-th column, and an output signal $V_{s,i+1}$ is obtained from output signal line 11 of the (i+1)th column, where i is an integer.

Figure 2:
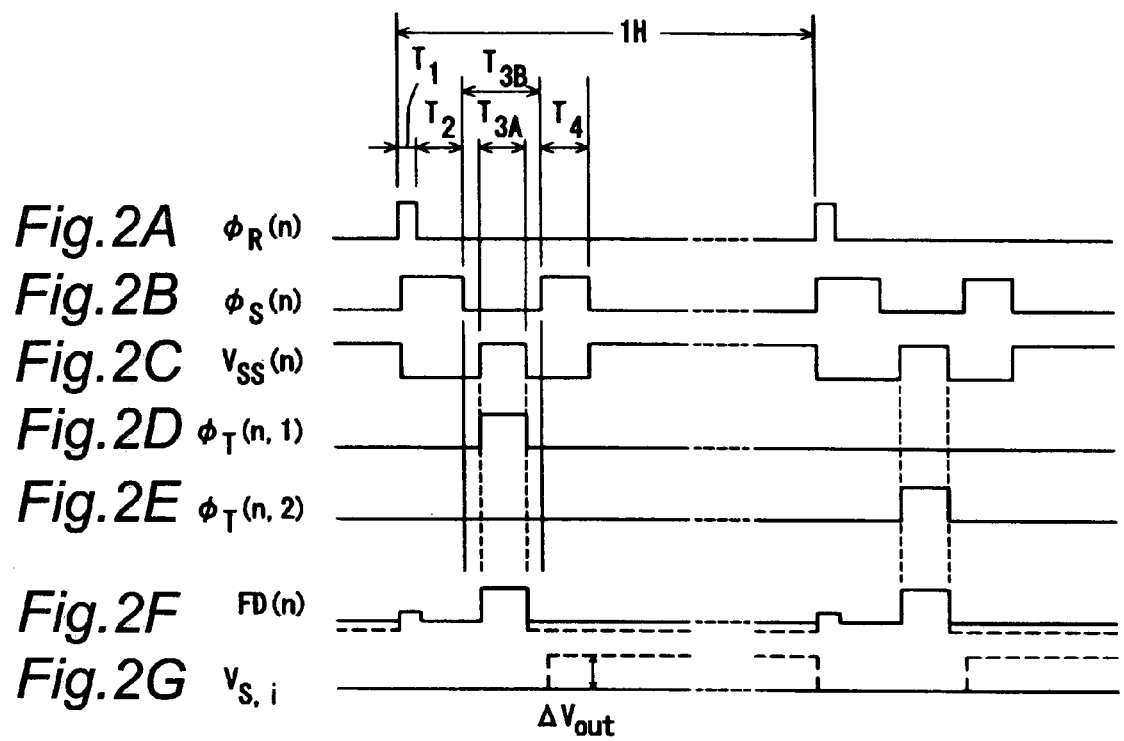
FIGS. 2A, 2B, 2C, 2D, 2E, 2F and 2G are timing charts of drive pulses in the two-dimensional amplifying solid-state image pickup device.

FIGS. 2A, 2B, 2C, . . . , 2G are timing charts for explaining the operation of the two-dimensional amplifying solid-state image pickup device shown in FIG. 1.

In a period $T_1$, a drive pulse $\phi_R(n)$ applied to the reset transistor 6 of the n-th switched capacitor amplification part 20 goes High level, causing the reset transistor 6 to turn to an On state. As a result, input and output of the inverting amplifier 9 are short-circuited, where the voltage of the signal charge storage part 8 is reset to a constant voltage $V_o$ for reasons which will be described later (see the explanation for FIGS. 4A and 4B).

In the next period $T_2$, the drive pulse $\phi_R(n)$ goes Low level, causing the reset transistor 6 to turn to an Off state. However, because the drive pulse $\phi_S(n)$ is at High level, the select transistor 5 turns to the On state. Meanwhile, the gate of the High-side transistor 4 of the inverting amplifier 9 goes High level, and the source of the Low-side transistor 3 is at the ground voltage. Therefore, the inverting amplifier 9 inverts and amplifies the voltage of the signal charge storage part 8, and the reset level is read to the vertical signal line 11 via the select transistor 5.

In the next period $T_{3B}$, the drive pulse $\phi_S(n)$ goes Low level, causing the select transistor 5 to turn Off. Also, in a period $T_{3A}$ included by the period $T_{3B}$, the drive pulse $\phi_T(n, 1)$ applied to the pixel (n, 1) goes High level, so that the potential level of the gate of the transfer transistor 2 rises. Resultantly, the signal charge stored in the photodiode 1 of the pixel (n, 1) is transferred to the signal charge storage part 8. Further, in this state, the source potential (drive pulse $V_{SS}(n)$) of the Low-side transistor 3 of the inverting amplifier 9) goes High level, so that the gate side potential of the transistor 3 rises. That is, by the rising of the potential of the signal charge storage part 8, the potential of the signal charge storage part 8 relative to the signal charge (electrons) deepens, by which the charge transfer from the photodiode 1 to the signal charge storage part 8 is accelerated, thus making a perfect charge transfer achievable.

In the next period $T_4$, the drive pulse $\phi_T(n, 1)$ goes Low level, causing the transfer transistor 2 to turn to an Off state, and the source voltage (drive pulse $V_{SS}(n)$) of the Low-side transistor 3 of the inverting amplifier 9 returns to the ground voltage. Meanwhile, the signal charge storage part 8 holds a voltage that is shifted from the voltage in the period $T_2$ by a variation due to the signal charge transfer, and the drive pulse $\phi_S(n)$ is at High level so that the select transistor 5 turns to the On state. Therefore, the signal level is amplified by the inverting amplifier 9, and read to the vertical signal line 11 via the select transistor 5.

It is noted that in FIGS. 2A, 2B, 2C, . . . , 2G, the period $T_{3B}$ is a period in which the select transistor 5 is kept Off, and the period $T_{3A}$ is a period in which the grounding-side terminal of the inverting amplifier 9 is kept at High level. When the grounding-side terminal of the inverting amplifier 9 is turned on High level, an On state of the select transistor 5 would cause the vertical signal line 11 to become a load to prevent the output signal $V_{out}$ (see FIGS. 5A and 5B) from promptly rising, and if the output signal $V_{out}$ does not promptly rise, the voltage FD(n) of the input side coupled thereto via the capacitance Cn of the capacitor 7 (i.e., potential of the signal charge storage part 8) could no longer be raised promptly. That is, since it becomes difficult to deepen the potential of the signal charge storage part 8 of the switched capacitor amplification part 20, the select transistor 5 is desirably kept Off securely during the period in which the grounding-side terminal of the inverting amplifier 9 is kept at High level.

It is noted that level changes depicted by dotted line in the voltage FD(n) in the timing charts of FIGS. 2A, 2B, 2C, . . . , 2G shows a case where signal charge generated in the photoelectric conversion transfer part 10 is large.

By the above operations, taking a difference signal between the signal of the period $T_2$ and the signal of the period $T_4$ in the vertical signal line 11 allows an effective signal due to electric charge generated by light incident on the pixel (n, 1) to be read. It is noted here that then term "effective signal" refers to a "net signal in which the offset voltage is canceled." With respect to the output voltage of an amplifier, generally, the offset voltage varies by amplifier by amplifier, so that reading the voltage as it is would cause the amplifier-basis offset voltage variations to appear on the resultant image, resulting in occurrence of rough fixed pattern noise. In this case, since similar offset voltage variations are included in the signal of the period $T_2$ and the signal of the period $T_4$, the variations are canceled by taking a difference signal ($\Delta V_{out}$ in FIG. 2G) between the two signals (correlation double sampling method).

Figure 3:
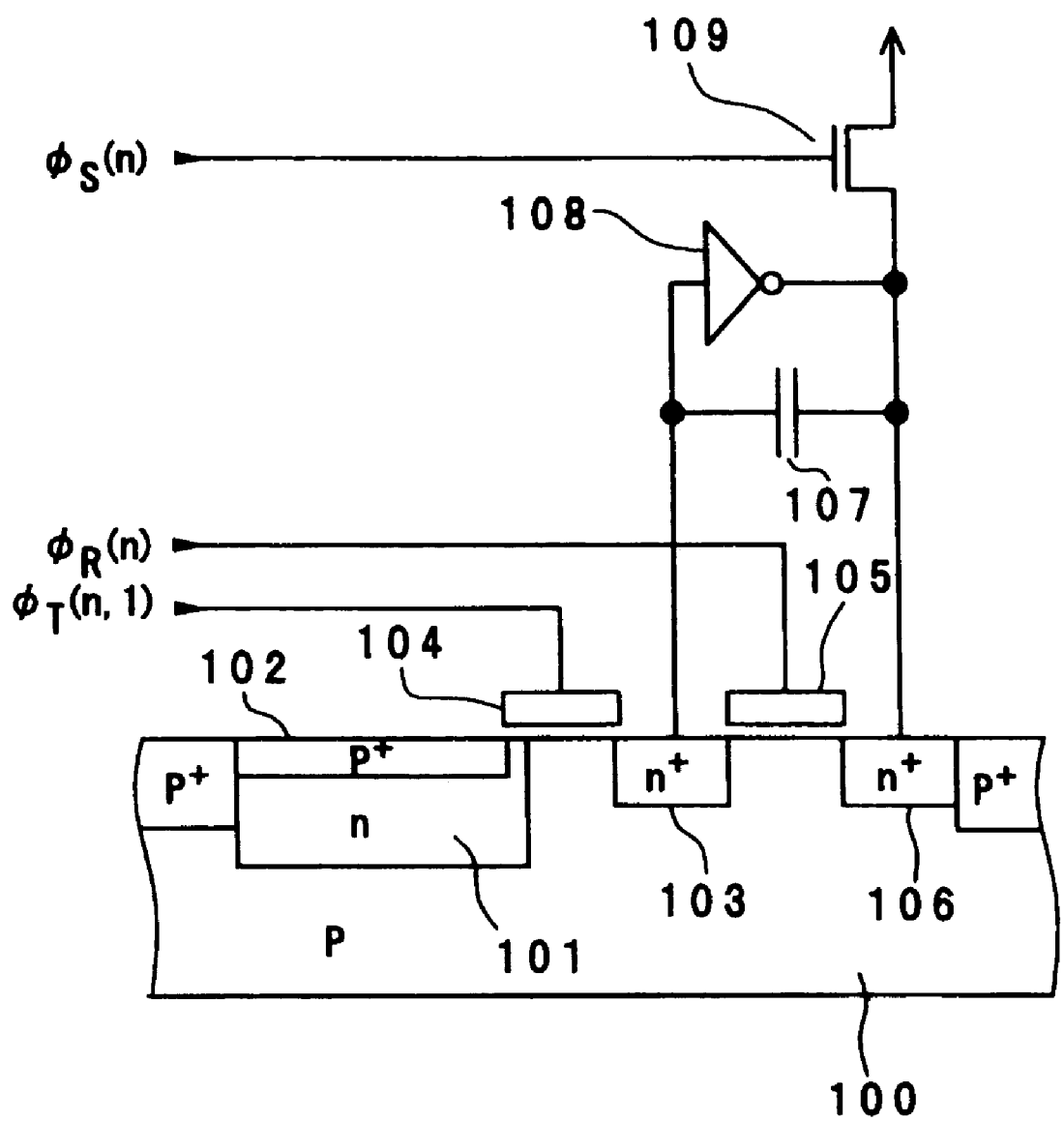
FIG. 3 is a view showing a sectional view of a pixel and a switched capacitor amplifier part in the two-dimensional amplifying solid-state image pickup device.

FIG. 3 is a view showing a cross section of one pixel and the switched capacitor amplifier part in FIG. 1. Although here is explained a case where the signal charge is electrons, yet a case of holes can be discussed likewise with the polarity reversed.

As shown in FIG. 3, an n-type layer (referred to as n layer hereinbelow) 101 is formed on p-type semiconductor substrate 100, and the n layer 101 is covered with a heavily doped $p^+$ layer 102, where the n layer 101 serves as a signal storage region of a buried photodiode. Also, a heavily doped $n^+$ layer 103 serves as a charge storage part. When the drive pulse $\phi_T(n, 1)$ applied to a transfer gate electrode 104 goes High level, signal charge of the n layer 101 of the photodiode is transferred to the heavily doped $n^+$ layer 103 via the transfer transistor (represented by 101, 103, 104). The signal charge transferred to the heavily doped $n^+$ layer 103 is amplified by an inverting amplifier 108 to which a capacitor 107 is connected between its input and output, and an output signal is delivered to a vertical signal line (not shown) via a select transistor 109. Also, when a drive pulse $\phi_R(n)$ applied to a reset gate electrode 105 goes High level, the charge of the heavily doped $n^+$ layer 103 is discharged to a heavily doped $n^+$ layer 106 by the reset transistor (represented by 103, 105, 106), by which the voltage of the heavily doped $n^+$ layer 103 is reset.

Figure 4A:
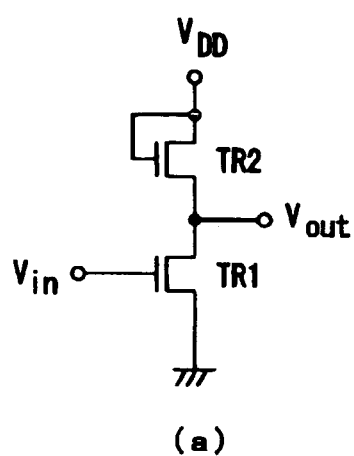
FIGS. 4A and 4B are operation explanatory views of an inverting amplifier in the two-dimensional amplifying solid-state image pickup device.
Figure 4B:
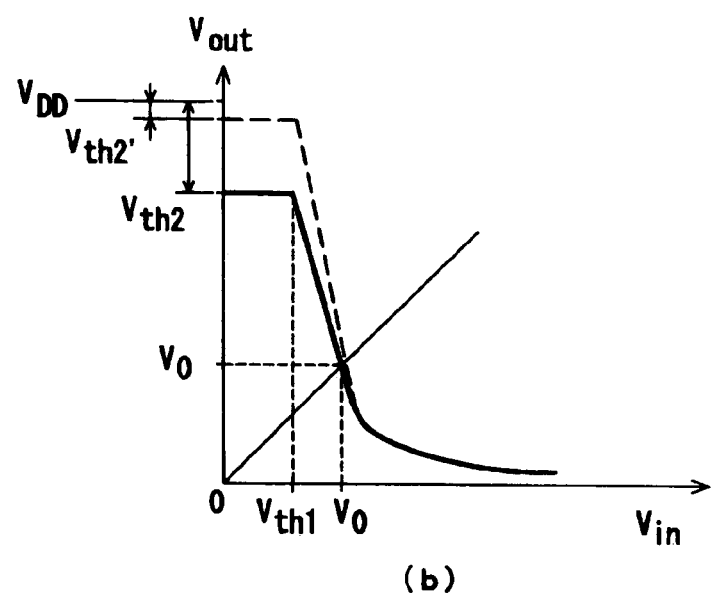

FIGS. 4A and 4B show the operation of the inverting amplifier 9 in FIG. 1. FIG. 4A is a circuit construction view and FIG. 4B is a view showing the relationship between input and output. Given that channel length and channel width of a Low-side transistor TR1 and a High-side transistor TR2 in FIG. 4A are L1, W1, L2 and W2, respectively, then a gain G can be expressed by the following Equation:

$$G = K \cdot \sqrt{\frac{\frac{W1}{L1}}{\frac{W2}{L2}}} \qquad \text{(Eq. 2)}$$

where $K=C_o/(C_o+C_b)$, $C_o$ is a gate-channel capacitance and $C_b$ is a channel-bulk capacitance. From Equation (2), the gain G increases more and more as (W1/L1)/(W2/L2) is increased more and more.

Referring to FIG. 4B, when an input signal $V_{in}$ has become beyond a threshold voltage Vth1 of the transistor TR1 (a threshold voltage in view of the gate voltage), the output signal $V_{out}$ starts to decrease. The starting voltage of the output signal $V_{out}$ is a value that the power supply voltage $V_{DD}$ has decreased by a threshold voltage Vth2 of the transistor TR2 (a threshold voltage in view of the source voltage).

The gain G is set to an as large a value as possible according to above (Equation 2). With the gain G enough large, in FIG. 1, the inverting amplifier 9 constituted by the transistors 3 and 4, the reset switch 6 and the capacitor 7 make up a switched capacitor amplifier. Accordingly, the signal charge of the signal charge storage part 8 is transferred to the capacitor 7 (capacitance $C_n$) and stored therein. That is, the capacity for conversion of signal charge into voltage effectively changes $C_{FD}$ to $C_n$, where a setting that $C_{FD>>}C_n$ makes it possible to increase the charge-voltage conversion efficiency η represented by the foregoing (Equation 1).

Now, short-circuiting between input and output of the inverting amplifier 9 causes the voltage of the signal charge storage part 8 to be fixed to the voltage $V_o$. This means that the input side voltage is reset to $V_o$.

Referring to FIG. 4B, assuming that the transistor TR2 is of the depression type and that a threshold value Vth2' smaller than the threshold voltage Vth2 is given, then the signal amplification on the output side can be enlarged, and moreover the gain can be slightly increased. Also, although detailed reasons are omitted, voltage rise of the signal charge storage part 8 resulting from changing the drive pulse $V_{SS}(n)$ from 0 V to $V_{DD}$ in FIG. 2C can be even more enlarged, thus further accelerating the charge transfer from the photodiode 1 to the charge detection part 8.

Figure 5A:
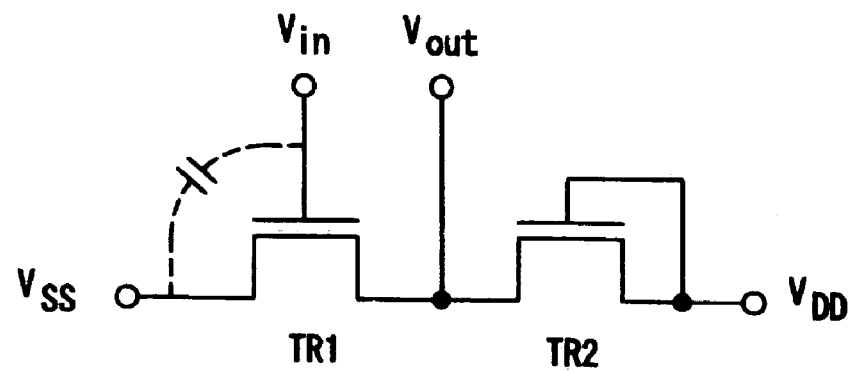
FIGS. 5A and 5B are views for explaining boosting operation of the inverting amplifier in the two-dimensional amplifying solid-state image pickup device.
Figure 5B:
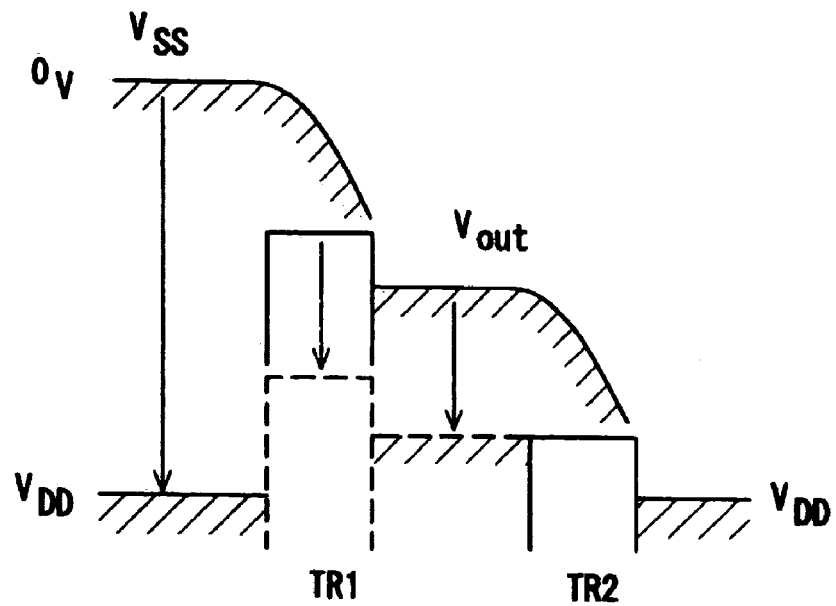

FIGS. 5A and 5B are views showing a technique of enhancing the input gate voltage $V_{in}$ by varying voltage of a grounding-side terminal of an inverting amplifier (corresponding to the inverting amplifier 9 of FIG. 1), which is composed of transistors TR1 and TR2, between the ground voltage and the power supply voltage $V_{DD}$. The input gate voltage $V_{in}$ of the transistor TR1 is a voltage close to $V_o$ of FIG. 4B and higher than the threshold voltage Vth1 of the transistor TR1. When the source voltage $V_{SS}$ of the transistor TR1 is raised from the grand voltage (0 V) to the power supply voltage $V_{DD}$ with the transistor TR2 kept in the On state, the current of the transistor TR1 runs from an On region to an Off region via a subthreshold region. The current of the transistor TR2, which is equal to the current of the transistor TR1, runs also along a similar course. As a result, the output voltage $V_{out}$ rises up to a voltage lowered from the power supply voltage $V_{DD}$ by the threshold voltage of the transistor TR2. Since the signal charge storage part 8 shown in FIG. 1 is connected via the capacitor 7 (capacitance $C_n$) to the output side of the inverting amplifier 9 from which the output voltage $V_{out}$ is outputted, a voltage rise of $V_o$ leads to a voltage rise of the signal charge storage part 8. That is, the charge transfer from the photodiode 1 to the signal charge storage part 8 becomes easier to achieve.

Figure 6A:
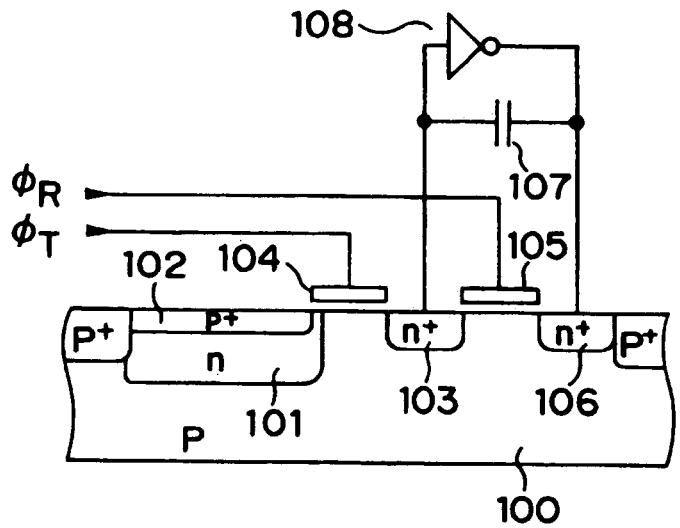
FIG. 6A shows a sectional view of another example of the pixel in the amplifying solid-state image pickup device shown in FIG. 1.
Figure 6B:
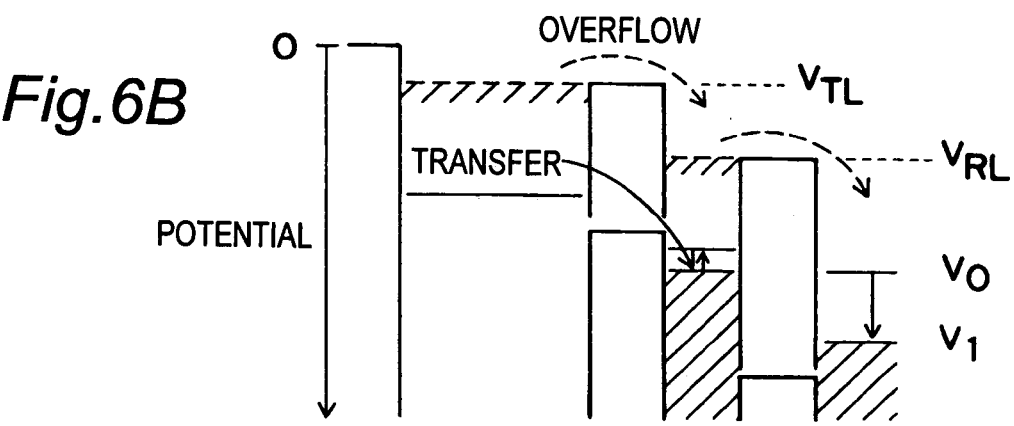
FIG. 6B shows a potential distribution chart thereof and FIG. 6C shows a relationship between input and output voltages of an inverting amplifier.
Figure 6C:
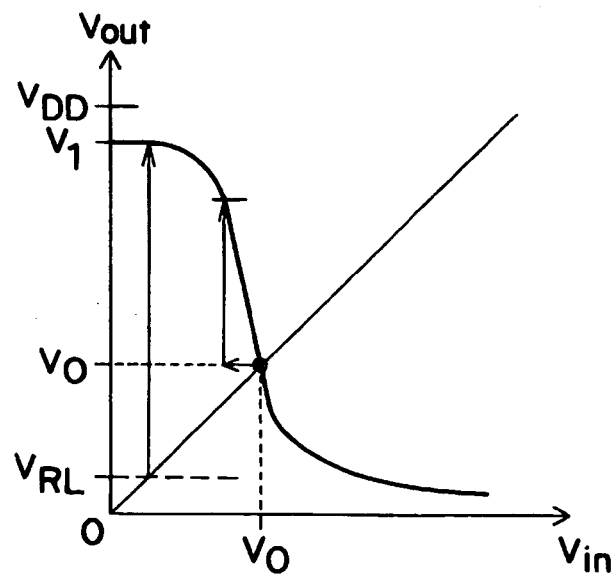

FIGS. 6A, 6B and 6C show a technique for suppressing blooming in the two-dimensional amplifying solid-state image pickup device of this embodiment. FIG. 6A shows a sectional view of the pixel and the switched capacitor amplification part, FIG. 6B shows a potential distribution thereof and FIG. 6C shows a relationship between input and output of the inverting amplifier. It is noted that the pixel cross section and the switched capacitor amplification part shown in FIG. 6A are similar in construction to the pixel cross section and the switched capacitor amplification part shown in FIG. 3 except the select transistor is omitted.

Referring to FIG. 6B, given that the potential of the channel region of the transfer transistor (represented by 101, 103, 104) in the Off state and the potential of the channel region of the reset transistor (represented by 103, 105, 106) in the Off state are expressed by $V_{TL}$ and $V_{RL}$, it is set that $$0 < V_{TL} < V_{RL}.$$

Therefore, signal charge excessively generated upon incidence of excessive light on a particular photodiode is outputted to the output side of the inverting amplifier 108 via the transistor (represented by 101, 103, 104) and the reset transistor (represented by 103, 105, 106). Under this situation, as shown in FIG. 6C, the potential of the input side of the inverting amplifier 108 becomes $V_{RL}$ and the potential of its output side becomes $V_1$, with the result of a high voltage and a low impedance. Accordingly, it becomes possible to suppress the occurrence of the blooming due to an overflow of excessively generated signal charge to neighboring photodiodes.

The above description has been made on a case where a plurality of the photoelectric conversion transfer parts 10 constituting a photoelectric conversion transfer part group to be connected to the switched capacitor amplification part 20 are arrayed in the vertical direction. However, the present invention is not limited to this, and the array direction may be either the horizontal direction or the horizontal direction and the vertical direction of a two-dimensional array. In these cases, however, changes in circuit construction are involved, giving rise to a need for preparing a timing chart of driving pulses corresponding to those changes.

Figure 7:
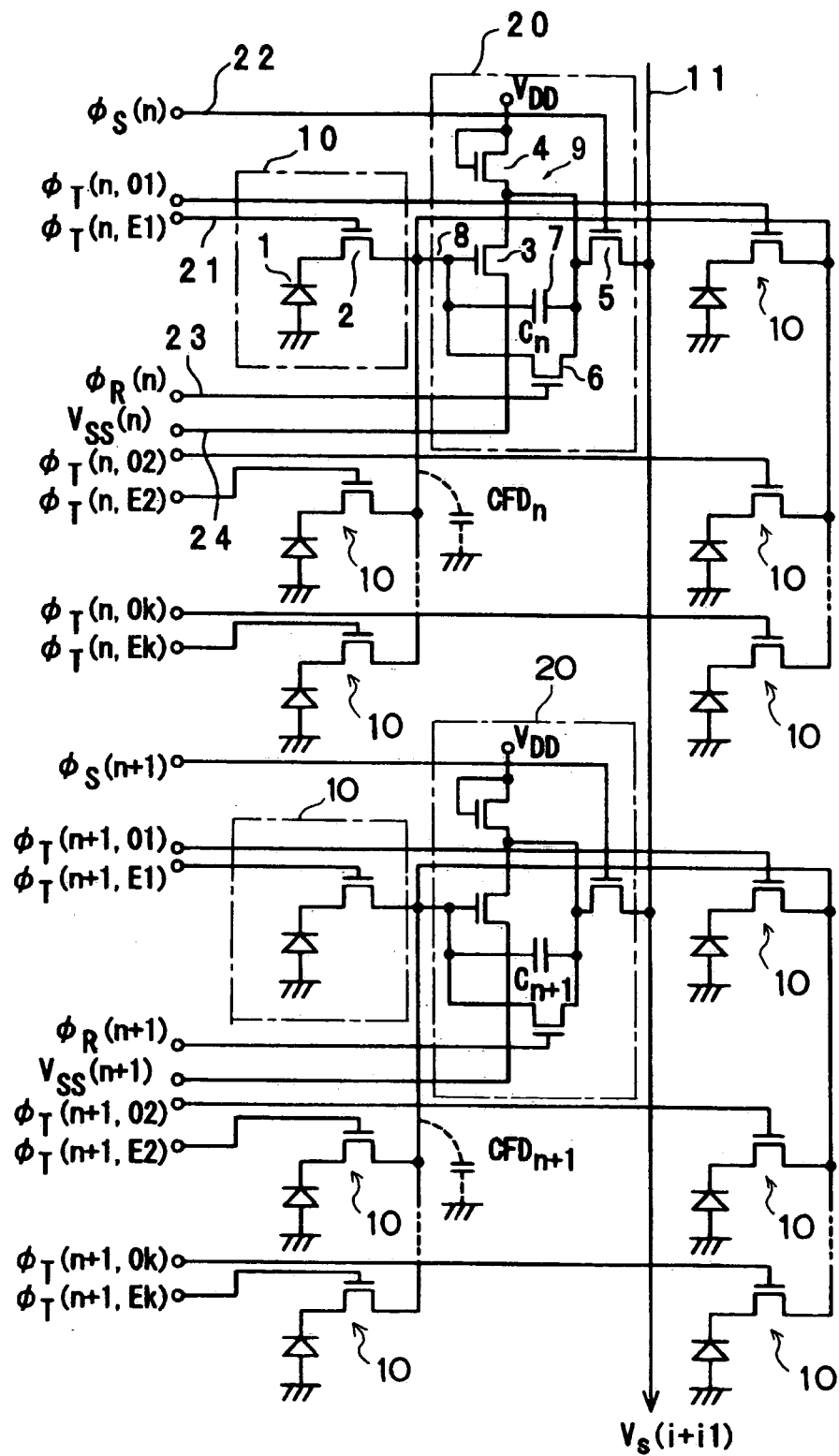
FIG. 7 is a circuit diagram showing main part of a two-dimensional amplifying solid-state image pickup device according to another embodiment of the invention.
Figure 8:
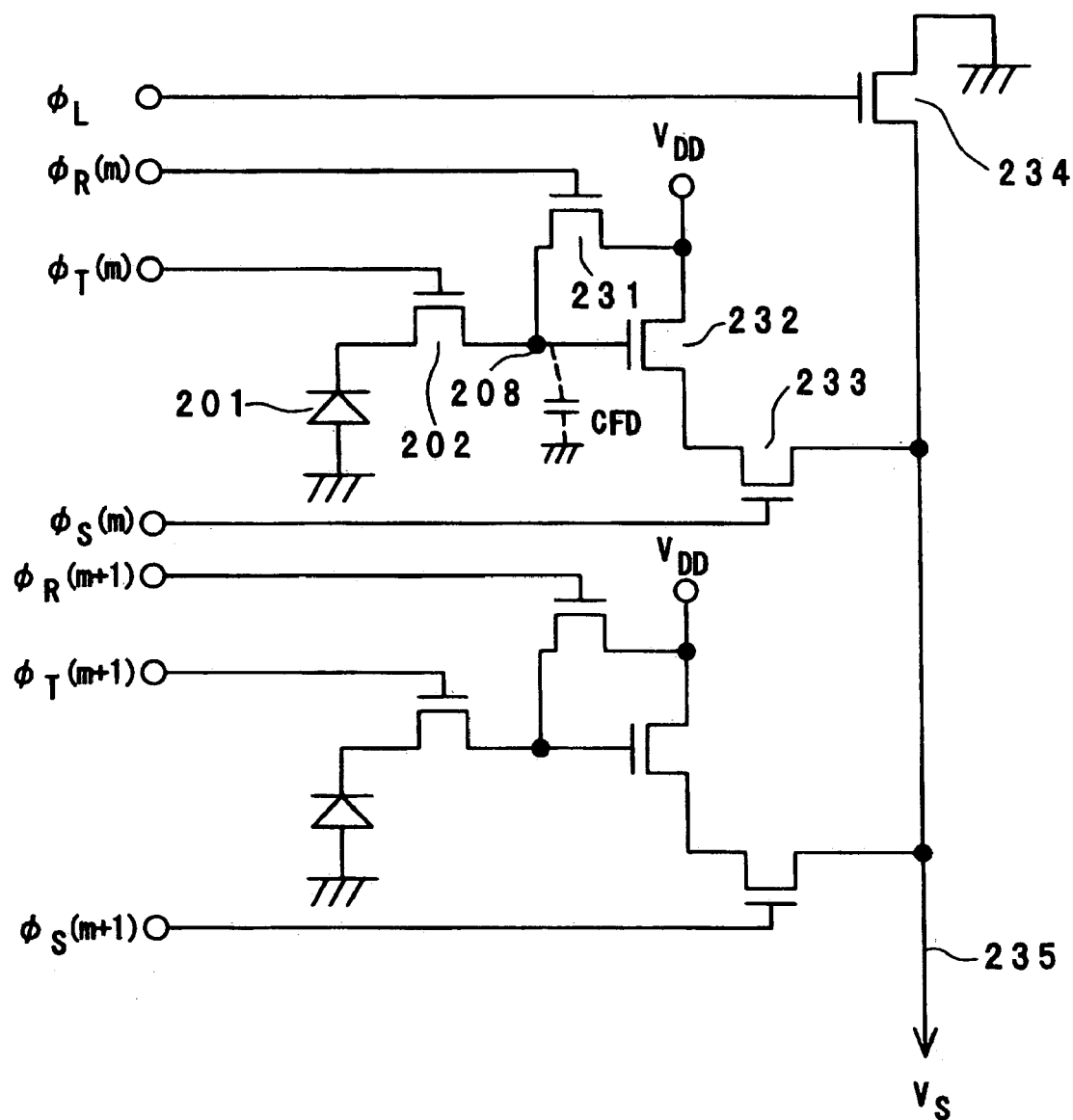
FIG. 8 is a circuit diagram of a plurality of pixels in an amplifying solid-state image pickup device according to a prior art.
Figure 9:
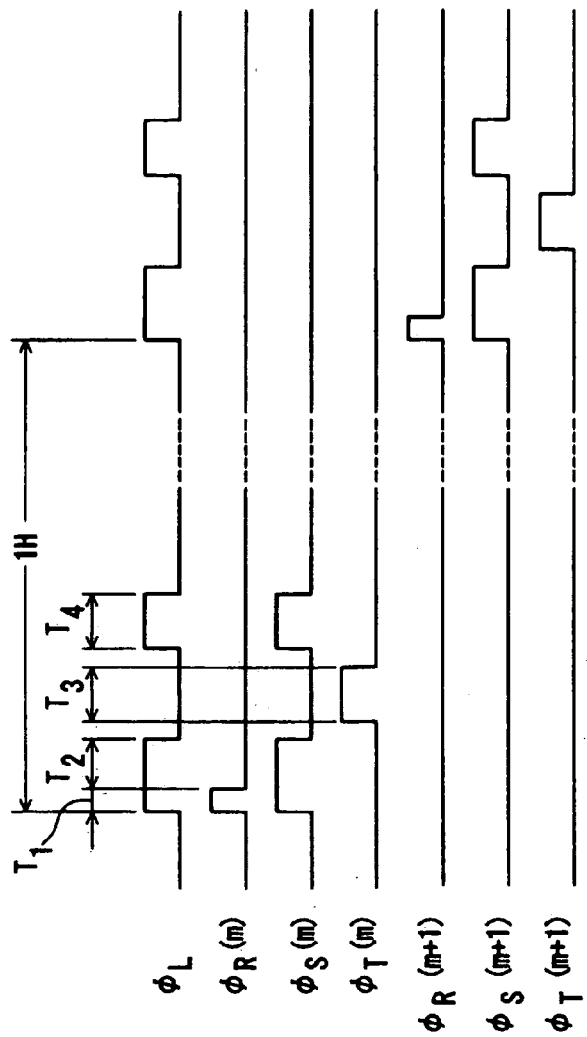
FIGS. 9A, 9B, 9C, 9D, 9E, 9F and 9G are timing charts of drive pulses in the amplifying solid-state image pickup device.
Figure 10:
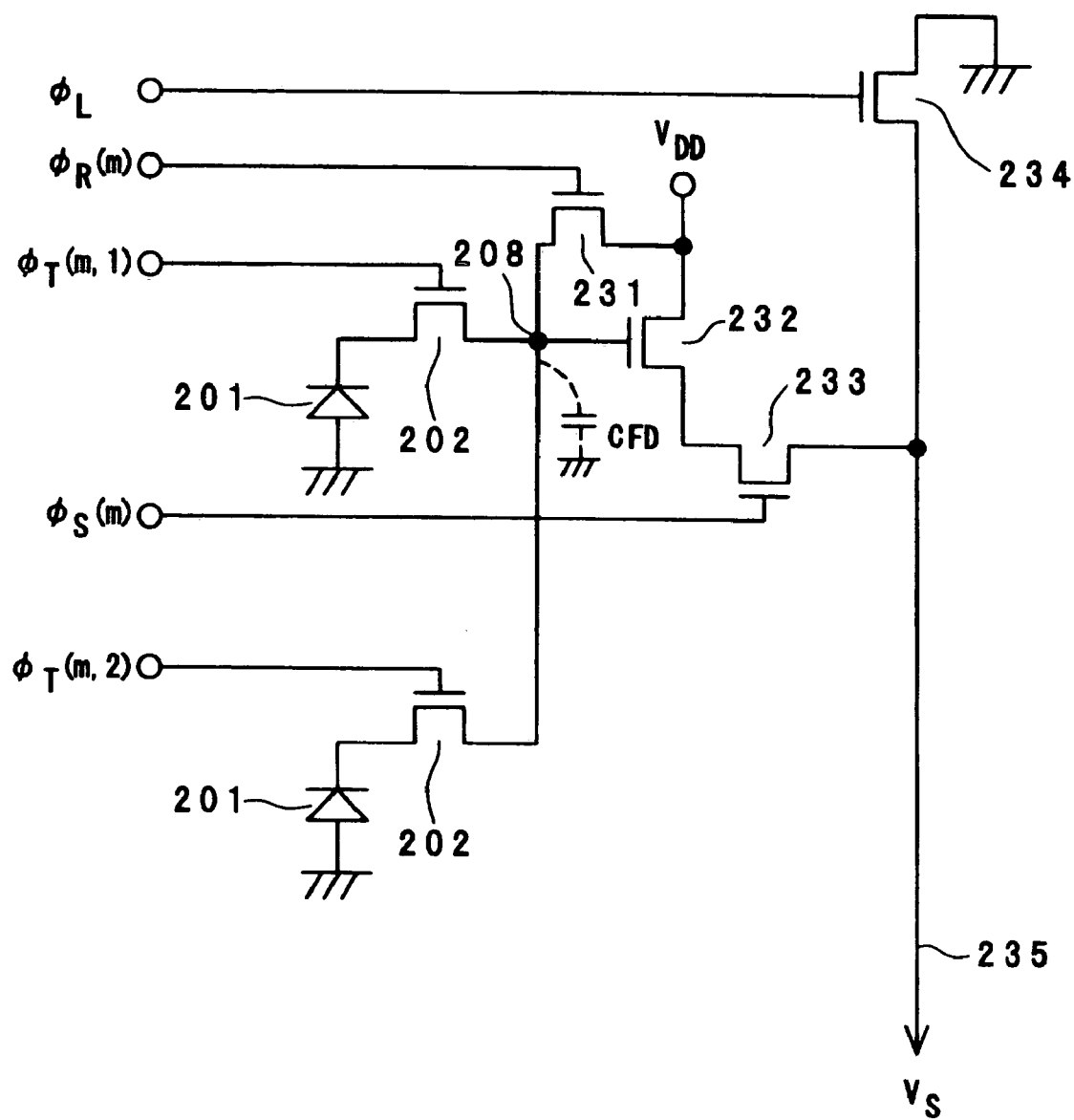
FIG. 10 is a circuit diagram of a plurality of pixels in another amplifying solid-state image pickup device according to a prior art.

For instance, FIG. 7 shows a circuit diagram of main part of a two-dimensional amplifying solid-state image pickup device in which vertically k (k: natural number) and horizontally 2 photoelectric conversion transfer parts 10 are connected to one switched capacitor amplification part 20. It is noted that the same constituent parts as those of the two-dimensional amplifying solid-state image pickup device of FIG. 1 are designated by like reference numerals, and their description is omitted.

This two-dimensional amplifying solid-state image pickup device differs from the two-dimensional amplifying solid-state image pickup device of FIG. 1 in that driving pulses of the transfer transistors 2 for an odd-number column of photoelectric conversion transfer parts 10 are different from driving pulses of the transfer transistors 2 for an even-number column of photoelectric conversion transfer parts 10, i.e., $\phi_T(n, 01), \phi_T(n, 02), \ldots, \phi_T(n, 0k)$ are different from $\phi_T(n, E1), \phi_T(n, E2), \ldots, \phi_T(n, Ek)$, respectively. As a result of this, it becomes possible to discriminably read the photoelectric conversion transfer parts 10 on one identical row connected to a common switched capacitor amplification part 20.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An amplifying solid-state image pickup device comprising:
    a plurality of photoelectric conversion transfer parts which are provided for individual pixels, respectively, and each of which has a photoelectric conversion element and a transfer transistor for transferring signal charge of the photoelectric conversion element, wherein
    the plurality of photoelectric conversion transfer parts are divided into a plurality of photoelectric conversion transfer part groups each composed of a specified number of the photoelectric conversion transfer parts, respectively; and wherein
the photoelectric conversion transfer part groups are arrayed in a matrix shape, and further comprising:
a plurality of switched capacitor amplification parts which are provided for the individual photoelectric conversion transfer part groups, respectively, whose input side is connected to an output side of each transfer transistor of the photoelectric conversion transfer parts and whose output side is connected to a signal line; and
a control part for, in each of the photoelectric conversion transfer part groups, controlling the transfer transistor and the switched capacitor amplification parts so as to iterate an operation of reading a signal from the photoelectric conversion element via the transfer transistor for the individual photoelectric conversion transfer parts, respectively, by the switched capacitor amplification part.

2. The amplifying solid-state image pickup device as claimed in claim 1, wherein
the switched capacitor amplification part comprises:
a signal charge storage part to which the output sides of respective transfer transistors of the photoelectric conversion transfer part group are connected;
an inverting amplifier to an input side of which the signal charge storage part is connected;
a reset transistor which is connected between input and output of the inverting amplifier;
a capacitance element which is connected between input and output of the inverting amplifier; and
a select transistor which is connected between an output side of the inverting amplifier and the signal line.

3. The amplifying solid-state image pickup device as claimed in claim 2, wherein
for transfer of signal charge from the photoelectric conversion element to the signal charge storage part of the switched capacitor amplification part via the transfer transistor, the control part controls voltage of a grounding-side terminal of the inverting amplifier so that potential of the input side of the inverting amplifier of the switched capacitor amplification part becomes deeper.

4. The amplifying solid-state image pickup device as claimed in claim 2, wherein
a power-supply side transistor out of transistors constituting the inverting amplifier of the switched capacitor amplification part is of a depression type.

5. The amplifying solid-state image pickup device as claimed in claim 2, wherein
a potential of a channel region of the transfer transistor in an Off state and a potential of a channel region of the reset transistor in an Off state are deeper than a substrate voltage, and the potential of the channel region of the reset transistor in the Off state is deeper than the potential of the channel region of the transfer transistor in the Off state.

6. The amplifying solid-state image pickup device as claimed in claim 1, wherein
the photoelectric conversion element is a buried photodiode.

* * * * *